United States Patent [19]

Hattori et al.

[11] 4,424,705
[45] Jan. 10, 1984

[54] ENGINE KNOCK SENSING APPARATUS

[75] Inventors: Tadashi Hattori, Okazaki; Masanori Hanaoka; Yukihide Hashiguchi, both of Toyota; Yoshinori Ootsuka, Okazaki; Hiroaki Yamaguchi, Anjo, all of Japan

[73] Assignees: Nippon Soken, Inc., Nishio; Toyota Jidosha Kogyo Kabushiki Kaisha, Toyota, both of Japan

[21] Appl. No.: 335,284

[22] Filed: Dec. 28, 1981

[30] Foreign Application Priority Data

Dec. 26, 1980 [JP] Japan .............................. 55-186273
Dec. 26, 1980 [JP] Japan .............................. 55-186274

[51] Int. Cl.³ ............................................. G01L 23/22
[52] U.S. Cl. ......................................... 73/35; 73/728
[58] Field of Search ................... 73/35, 115, 707, 706, 73/708, 715, 728; 123/425, 435

[56] References Cited

U.S. PATENT DOCUMENTS

| 2,403,774 | 7/1946 | Whitty et al. | 73/35 X |
| 2,641,719 | 6/1953 | Adams | 73/35 X |
| 4,266,421 | 5/1981 | McDougal | 73/35 |
| 4,299,117 | 11/1981 | Andrews et al. | 73/35 |

Primary Examiner—James J. Gill
Attorney, Agent, or Firm—Cushman, Darby & Cushman

[57] ABSTRACT

A knocking sensing apparatus for sensing a knocking taking place in an internal combustion engine. The apparatus includes a diaphragm adapted to operate in response to the pressure of cooling water circulated in the engine, magnetism generating device, magnetic circuit including the diaphragm, and a magnetic flux detecting device adapted to detect in a manner like alternating current the change in the magnetic flux in the magnetic circuit caused by the operation of the diaphragm.

3 Claims, 14 Drawing Figures ial combustion engine, suitable for use in ignition timing controller for optimizing the ignition timing. More particularly, with the knowledge that the pressure impulse or pulsation generated in the cylinder of the engine as a result of the knocking is transmitted to the cooling water through the cylinder wall and propagated through the cooling water, the invention aims at providing a knocking sensing apparatus taking place in an internal combustion engine through sensing the pulsation of the cooling water pressure.

As is well known, the internal pressure of the cylinder of the internal combustion engine is closely related to the ignition timing. In the explosion of the mixture in the cylinder after the ignition, the internal pressure of the cylinder does not include any higher harmonic provided that no knocking is taking place in the cylinder. The "higher harmonics" are the vibration components of frequencies normally ranging between 5 to 10 KHz and between 10 to 13 KHz, determined by the bore diameter of the cylinder and the sonic speed during the combustion. The higher harmonics are produced as a result of discontinuous quick combustion. If a knock takes place in the cylinder, the internal pressure of the cylinder comes to involve the higher harmonics when the internal pressure is increased to the level approximating the maximum combustion pressure. In consequence, a specific vibration or sound is transmitted to the outside of the cylinder. More specifically, in the initial state of the knocking referred to as "trace knock", the higher harmonics start to appear at the crank angle corresponding to the maximum combustion pressure. Then, as the knocking becomes stronger to the state called "light knock" and then to "heavy knock", the crank angle at which the higher harmonics appear is shifted to the advancing side, i.e. toward the crank angle corresponding to the ignition, from the crank angle of the maximum combustion pressure.

It is possible to remarkably improve the efficiency of the engine by optimumly controlling the ignition timing, through a precise detection of the shift of timing or the crank angle at which the higher harmonics appear.

However, as well known to those skilled in the art, there are some difficulties or problems in sensing the knocking through the detection of the pressure impulse, as explained hereinunder.

(1) It is true that the direct detection of the internal pressure of the cylinder by a pressure detector is the most efficient way of sensing the knocking. This, however, requires an independent detector for each of a multiplicity of cylinders of the engine, so that the cost of the knocking sensor is raised uneconomically. In addition, it is quite difficult to construct such a pressure detector of moderate cost as being capable of stably operating at high temperature and pressure for the controlling purpose. In fact, there still is no pressure detector commercially available and practically usable for the purpose described.

(2) It is also known that the knocking can be sensed indirectly through detecting, for example, the vibration transmitted to the outside of the cylinder. The engine block constituting the cylinder, however, has its peculiar vibration characteristics. Therefore, the change of the internal pressure caused by a knocking tends to be attenuated or filtered before it is picked up at the outside of the engine block. Namely, the sound/noise ratio S/N is lowered to make it difficult to sense the occurrence of knocking accurately. The signal picked up at the outside of the engine block, therefore, does not correctly represent the change of the internal pressure caused by the knocking, so that the ignition timing control system often fails to operate adequately. This problem is serious particularly when the engine has a multiplicity of cylinders. Namely, it is difficult to sense the knocking occurring in the cylinder remote from the position of the vibration detector. In addition, the noises such as valve down noise impedes the precise dection of the noise. Thus, this knocking sensing system is still unsatisfactory. Although it is possible to effect a feedback control of the ignition timing with this knocking sensing system, the control circuit tends to become complicated to avoid erroneous operation. Thus, for achieving the satisfactory knocking sensing performance, the system inevitably becomes more complicated and expensive.

SUMMARY OF THE INVENTION

Under these circumstances, the present inventors have made various studies to find out a knocking sensing apparatus which makes it possible to sense the knocking taking place in the engine more accurately than the conventional knock sensing apparatus, and reached a conclusion that a precise sensing of the knocking taking place in the engine can be achieved through a detection of the pressure propagated through the cooling water circulated in the engine.

To this end, according to the invention, there is provided a knocking sensing apparatus having a diaphragm adapted to be deflected in accordance with the cooling water pressure and a sensing portion adapted to operate in response to the deflection of the diaphragm only in a manner like an alternating current or in a differentiating manner, so that only the pulsative component of the water pressure is sensed without being affected by the static component of the water pressure.

DESCRIPTION OF THE PREFERRED EMBODIMENTS

Figure 1A:
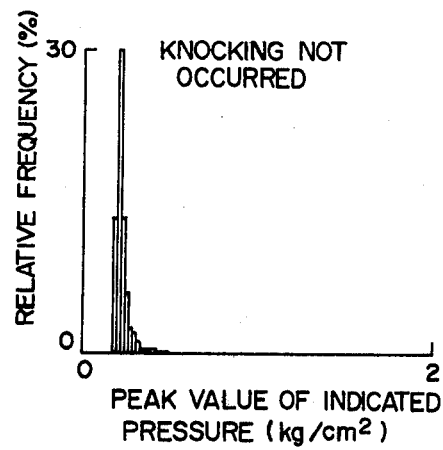
FIGS. 1A to 1D are characteristic charts showing the relationship between the pulsation of the internal pressure of a cylinder of an engine and the pulsation of the pressure of the cooling water circulated in the engine.
Figure 1B:
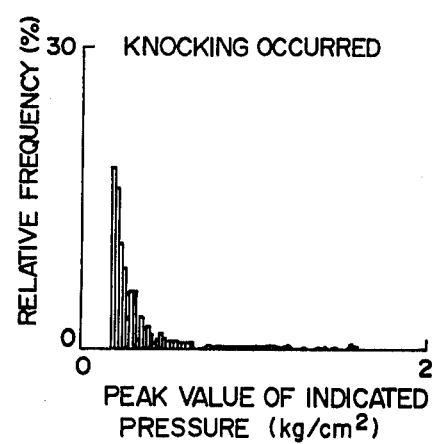
Figure 1C:
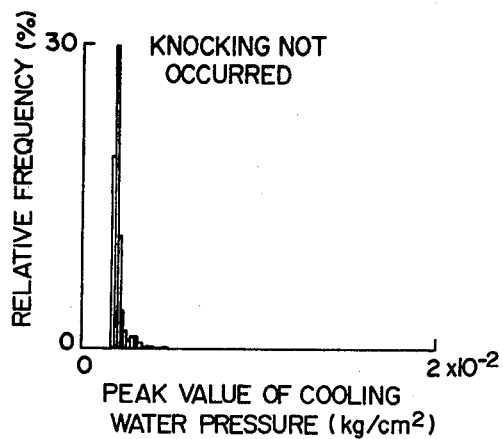
Figure 1D:
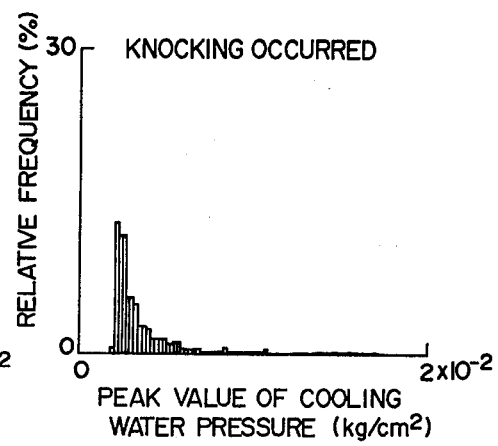

FIGS. 1A and 1B show the relative frequencies of pulsation of the internal pressure of cylinder of a straight type engine, in the state where a knocking is not taking place and in the state where the knocking is taking place, respectively, while FIGS. 1C and 1D show the pulsations in the cooling water pressure in the same engine under the same operation condition, in the state where a knocking is not taking place and in the state where a knocking is taking place, respectively. From the comparison of these Figures, it will be seen that the pulsation in the cooling water pressure substantially approximates the pulsation in the internal pressure. This means that a highly precise sensing of the knocking can be achieved through the detection of the pulsation in the cooling water pressure. It is also understood that this sensing method can apply not only to a single cylinder engine but also to the engines having a multiplicity of cylinders.

The level of the pulsation of the cooling water pressure is generally in the order of 0.1 Kg/cm$^2$ or lower. Meanwhile, the static pressure of the order of 0.9 to 1.5 Kg/cm$^2$ is applied to the cooling water circulated in the engine. Therefore, in order to sense the pulsation of the water pressure at a practically acceptable degree of precision, it is preferred to detect only the pulsative component of the water pressure while removing the static pressure component.

Figure 2:
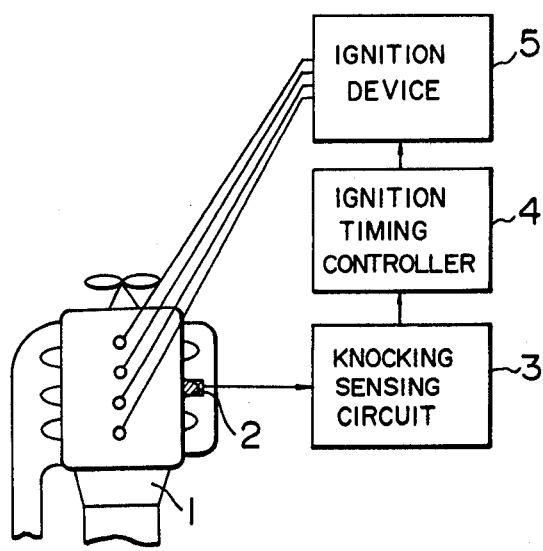
FIG. 2 is a block diagram of a knock-feedback type ignition control system.
Figure 3A:
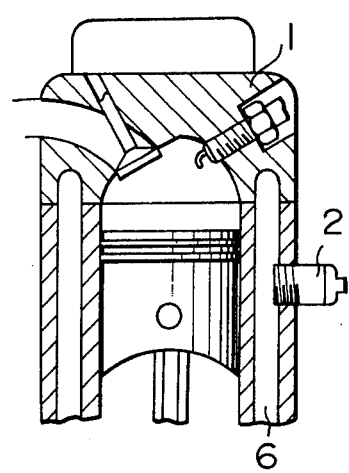
FIGS. 3A and 3B are illustrations of mounting of a knocking sensing apparatus in accordance with the invention.
Figure 3B:
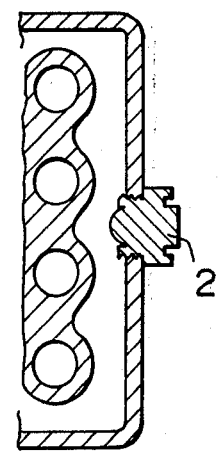

FIG. 2 is a block diagram of a knock-feedback type ignition system incorporating a knocking sensing apparatus in accordance with the invention. FIGS. 3A and 3B show how the knocking sensing apparatus of the invention is mounted on the engine. The knocking sensing apparatus 2 is attached by screwing to the wall of the cooling water system surrounding the cylinders of a straight type engine 1 having four cylinders, in such a manner that one of the sensing apparatus 2 is exposed to the cooling water in the cooling water system. Referring back to FIG. 2, a knocking sensing circuit 3 senses the occurrence of a knocking in the engine through the signal derived from the knocking sensing apparatus, while an ignition timing controller 4 shifts the ignition timing ahead or aback in accordance with the signal from the sensing circuit 3, thereby to optimize the ignition timing.

The output from the controller 4 is delivered to sparking plugs attached to cylinders of the engine 1, through a known ignition device 5, thereby to ignite the mixture introduced into each cylinder.

The knocking sensing circuit 3 senses the occurrence of the knocking in the following manner. A sampling of the noise components of the vibration of engine is effected by making use of the output from the sensing apparatus 2, in a predetermined period of time or in a predetermined range of crank angle from the moment or crank position of ignition. In such a period or the crank angle range, the knocking of the engine does not take place. Similarly, the sampling of the pressure is made by the same sensing apparatus 2 in a predetermined crank angle range after the T.D.C. (after the peak of indicator pressure), in which the knocking is probable to take place. The judgement as to whether the knocking is taking place or not is made by means of the ratio of the level between the output from the sensor 2 in the first period or crank angle range immediately after the ignition and that in the second period or crank angle range after the T.D.C. The comparison may be made in the form of independent sample values or in the form of integrated values, i.e. mean values. Alternatively, the judgement of occurrence of the knocking is made as a matter of probability, e.g. by the evaluation of number of cycles suffering the knocking in 100 successive ignitions.

The knocking sensing apparatus of the invention can be applied to any known ignition timing control system adapted for controlling the ignition timing upon detect of the occurrence of the knocking. The detailed description of the control system, therefore, is omitted here.

Figure 4:
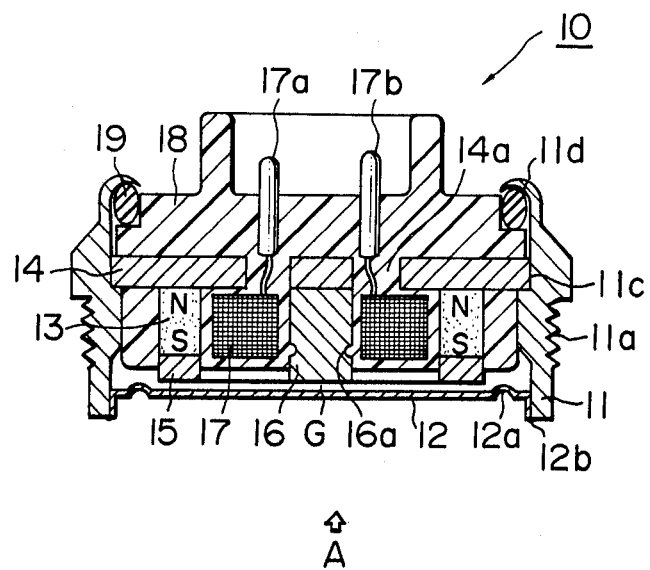
FIGS. 4 to 10 are sectional views of knocking sensing apparatus in accordance with first to seventh embodiments of the invention.

Referring now to FIG. 4 a knocking sensing apparatus 10 in accordance with a first embodiment of the invention has a diaphragm 12 exposed to the cooling water and adapted to be deflected in response to the change in the cooling water pressure, a housing 11 provided at its lower end with a screw thread 11a for mounting, a magnet 13 of ferrite or alnico having a cylindrical form and magnetized as illustrated, a disc-shaped magnetic plate 14 having communication holes 14a, a ring-shaped magnetic member 15 in contact with the magnet 13, a central magnetic path 16 fixed integrally to the magnetic plate 14 by welding or the like, and a coil 17.

The diaphragm 12 has a disc-like form with an annular recess 12a, and is welded at its entire periphery to the lower end portion of the housing 11. The annular recess 12a serves to facilitate the deflection of the diaphragm 12. The coil 17 is adapted to detect the change in the magnetic flux attributable to the change in the magnetic resistance of the central magnetic path 16, and to produce an output corresponding to the rate of change of the magnetic flux density per unit time. The voltage produced by the coil 17 is delivered to the outside of the knocking sensing apparatus through output terminals 17a, 17b.

The magnetic plate 14, magnet 13, magnet member 15, central magnetic path 16, coil 17 and the output terminals 17a, 17b are integrated with a resin in the form of a resin mold member 18.

The assembly consisting of the magnet coil, magnetic plate, central magnetic path or the like thus integrated is fixed in the housing 11 by fitting the assembly until the outer periphery of the magnetic plate 14 comes to rest on the step or shoulder of a fitting portion 11c of the housing, placing an "O" ring 19 on the periphery of the mold member 18 and then caulking the upper edge of the housing 11 over its entire periphery onto the "O" ring 19. In consequence, an air gap G is formed between the inner surface of the diaphragm 12 and the opposing end surfaces of the central magnetic path 16 and the magnetic member 15. Since the diaphragm 12 is made of a magnetic material such as ferrite, magnetic stainless steel or the like, the density of magnetic flux in the magnetic circuit is changed as the air gap G is changed as a result of a deflection of the diaphragm 12.

In operation, when a knocking is taking place in the engine, a pulsation is generated in the cooling water system and is propagated through the cooling water so as to be applied in the direction of the arrow A to the diaphragm 12 of the knocking sensing apparatus 10 exposed to the cooling water. In consequence, the diaphragm 12 is deflected in a pulsating manner in response to the pulsation of the cooling water pressure, thereby to cause a change in the gap G. As a result, the magnetic flux in the magnetic circuit constituted by the magnet 13, magnetic member 15, diaphragm 12, central magnetic path 16 and the magnetic plate 14 is changed in response to the change in the gap G, so that the coil 17 produces an output in the form of an alternating current or voltage. This output is delivered through the output terminals 17a, 17b to the knocking sensing circuit thereby to effect the control of the ignition timing as explained before.

Figure 5:
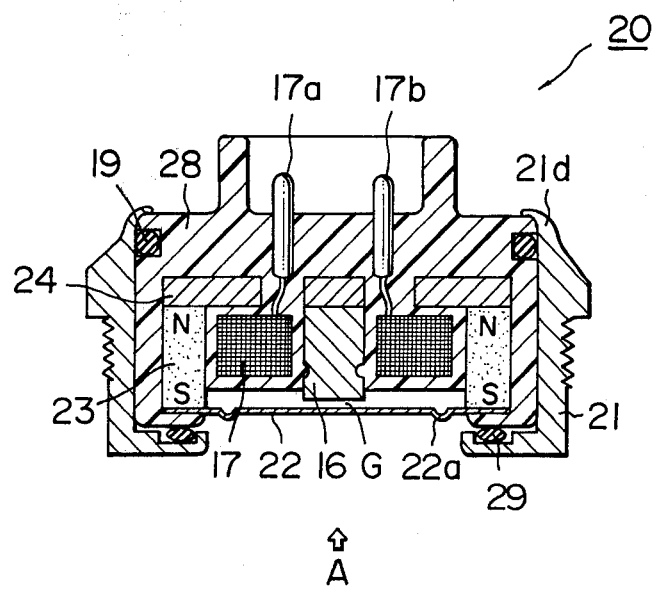

FIG. 5 shows a knocking sensing apparatus 20 in accordance with a second embodiment of the invention in which the same reference numerals are used to denote the same parts or members as used in the first embodiment explained in connection with FIG. 4. A diaphragm 22 disposed such that its one side makes a direct contact with the lower end of a magnet 23. A magnetic plate 24 and a housing 21 are embedded in a resin mold member 28 but are spaced from each other. The magnet 23, magnetic plate 24, central magnetic path 16, coil 17 and the output terminals 17a, 17b are beforehand integrated with a mold to form the above-mentioned resin mold member 28. This resin mold member 28 is placed in the housing 21 while being sealed by means of "O" rings 19, 29. Then, the upper peripheral edge 21d of the housing 21 is calked to fix the resin mold member 28. In the assembled state, a gap G is formed between the end of the central magnetic path 16 and the diaphragm 22. Since the diaphragm 22 makes a direct contact at its one side with the magnet 23, the leak of the magnetic flux from the magnetic circuit is diminished to ensure a sufficiently high level output from the coil. In addition, since the diaphragm is not welded directly to the housing but is fixed through the mediums of the "O" rings and the resin mold member, the diaphragm is less liable to be influenced by the mechanical vibration transmitted from the engine block or the like. Furthermore, the cost of the knocking sensing apparatus of this embodiment is sufficiently lower than that of the knocking sensing apparatus 10 shown in FIG. 4, because the magnetic member 15 can be dispensed with.

In operation, the pulsation of the cooling water pressure caused as a result of a knocking taking place in the engine is applied as indicated by an arrow A to one side of the diaphragm 12 so that the magnetic flux in the magnetic circuit is changed correspondingly. Then the coil 17 produces an output corresponding to the rate of change in the magnetic flux per unit time. The output is delivered through the output terminals 17a, 17b to the knocking sensing circuit 3 to suitably control the ignition timin.

Figure 6:
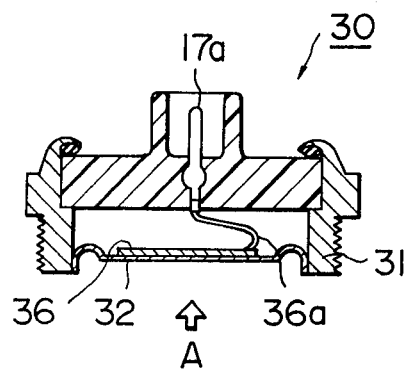

FIG. 6 shows a knocking sensing apparatus 30 constructed in accordance with a third embodiment of the invention, in which the same reference numerals are used to denote the same parts or members as those used in the first embodiment explained in connection with FIG. 4.

A disc-shaped diaphragm 32 made of an electrically conductive material has a piezoelectric element 36 fixed to one side thereof by means of a conductive adhesive or by a spattering. The diaphragm 32 is grounded through a housing 31. Although not shown, a thin electrode film is fixed to the other side of the piezoelectric element 36 and is connected through a lead 36a to the output terminal 17a.

In operation, the pulsation of water pressure caused by a knocking taking place in the engine and propagated through the cooling water is applied to the diaphragm 32 to deflect the latter in a pulsating manner, so that a stress is generated in the piezoelectric element 36 thereby to make the latter produce an output which is delivered through the lead line 36a and the terminal 17a to the knocking sensing circuit 3 shown in FIG. 2, thereby to control the ignition timing.

Figure 7:
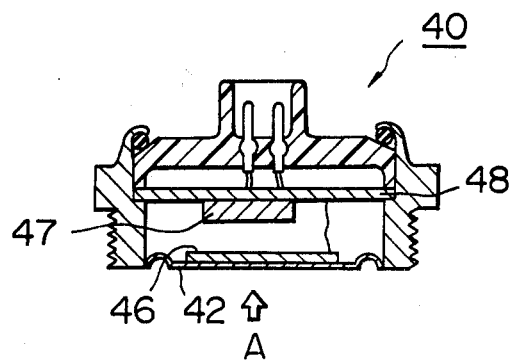

FIG. 7 shows a knocking sensing apparatus 40 constructed in accordance with a fourth embodiment of the invention in which the same reference numerals are used to denote the same parts or members as those used in the first embodiment explained in connection with FIG. 4. The knocking sensing apparatus 40 of this embodiment is distinguished from the third embodiment by an impedance transducer such as an operation amplifier 47 and a printed circuit board 48 to which the operation amplifier 47 is connected electrically.

In operation, the pulsation of the cooling water pressure attributable to the knocking is transmitted to the knocking sensing apparatus 40 to make the piezoelectric element 46 produce an electric signal as in the case of the third embodiment shown in FIG. 6. In general, the piezoelectric element has a high impedance. Therefore, when the piezoelectric element is used for sensing the knocking taking place in the engine of the spark ignition type, the line leading from the sensing element to the sensing circuit tends to pick up noises such as those produced by the sparks on the ignition plugs. To avoid this, in this embodiment shown in FIG. 7, the output from the sensing piezoelectric sensing element is transduced by an impedance transducer such as an operation amplifier to have lower impedance, before delivered to the knocking sensing circuit. By so doing, it is possible to eliminate any noise which may, for otherwise, be picked up by the line between the sensing element and the sensing circuit.

Figure 8:
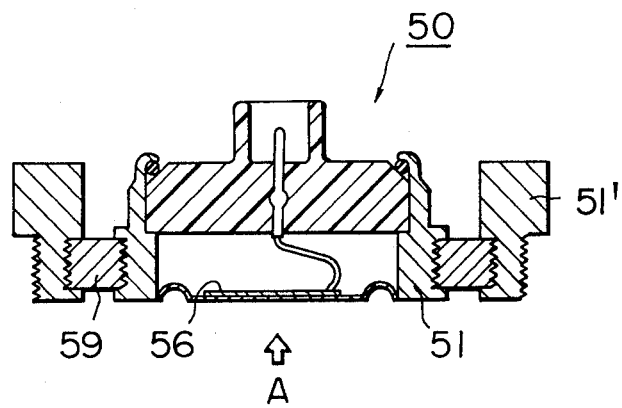

FIG. 8 shows a knocking sensing apparatus 50 constructed in accordance with a fifth embodiment of the invention. This apparatus 50 of the fifth embodiment is distinguished from the knocking sensing apparatus 30 shown in FIG. 6 by a damper 59 interposed between a first housing 51 and a second housing 51' thereby to avoid any influence of the pulsation other than the pulsation of the cooling water pressure, e.g. the vibration of the engine block.

Figure 9:
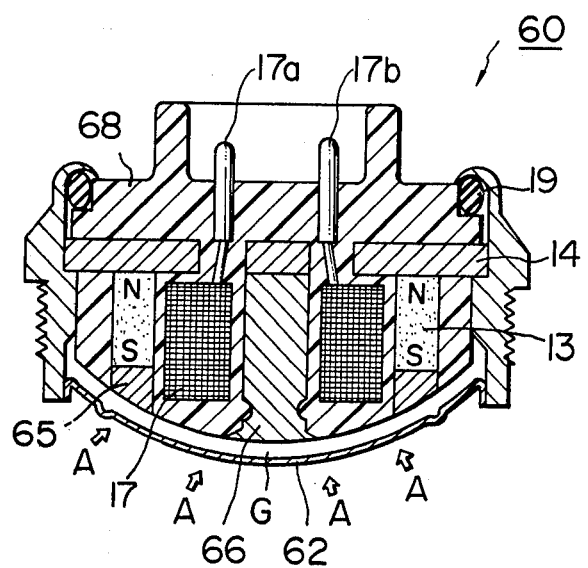

FIG. 9 shows a knocking sensing apparatus 60 constructed in accordance with a sixth embodiment of the invention, in which the same reference numerals are used to denote the same parts or members as those used in the first embodiment explained before in connection with FIG. 4. The knocking sensing apparatus 60 of the sixth embodient differs from that of the first embodiment 10 shown in FIG. 4 in that the diaphragm 62, magnetic member 65, central magnetic path 66 and the resin mold 68 are formed to have hemispherical surfaces. In operation, the pulsation of the water pressure is applied to the diaphragm substantially perpendicularly to the latter, irrespective of the position of the cylinder suffering the knocking, i.e. regardless of in which one of the cylinders the knocking is taking place.

Figure 10:
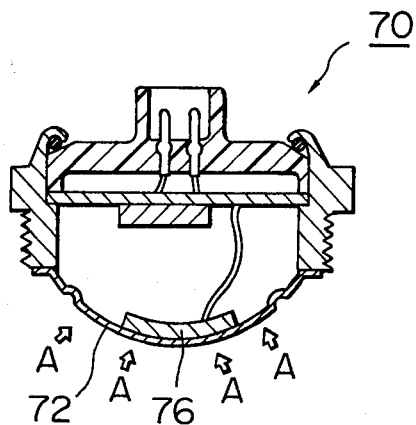

FIG. 10 shows a knocking sensing apparatus 70 constructed in accordance with a seventh embodiment of the invention. The knocking sensing apparatus 70 of this embodiment differs from the knocking sensing apparatus 40 shown in FIG. 7 in that the diaphragm 72 and the piezoelectric element 76 have hemispherical surfaces.

In operation, the pulsation of the water pressure caused by the knocking is applied to the diaphragm surface substantially perpendicularly thereto, regardless of the position of the cylinder in which the knocking is taking place.

In the knocking sensing apparatus shown in FIGS. 9 and 10, the diaphragms 62, 72 have hemispherical surfaces, respectively, so as to oppose to each cylinder of the engine, so that the pulsation of water pressure caused by the knocking is detected at a high precision irrespective of the position of the cylinder in which the knocking is taking place. It is, therefore, possible to sense the knocking occurring in any one or more of a plurality of cylinders simultaneously and equally, without suffering any erroneous sensing, by a single sensing apparatus.

As has been described, according to the invention, there is provided a knocking sensing apparatus in which only the pulsative component of the water pressure produced by a knocking is detected by the diaphragm exposed to the cooling water, and the pulsation of the diaphragm is detected in a manner like alternating current by a magnetic means or a piezoelectric means.

Since the pulsative component of the pressure can be propagated through water with smaller attenuation as compared with the propagation of mechanical vibration through the engine block, it is possible to sense simultaneously the knocking taking place in a plurality of cylinders with a single knocking sensing apparatus. In addition, the knocking sensing apparatus of the invention is less liable to make an erroneous sensing, and can sense the occurrence of the knocking at a high accuracy.

In the knocking sensing apparatus of the invention, only the pulsation of the water pressure is detected by the diaphragm and is taken out in a manner like alternating current by means of a magnetic means or a piezoelectric means. It is, therefore, possible to construct the diaphragm to have a high sensitivity even to a delicate change in the water pressure, which in turn permits a high precision of sensing of the occurrence of knocking in the engine.

In the embodiments described heretofore, the knocking is sensed by means of a diaphragm exposed to the cooling water circulated in the engine and capable of sensing only the pulsation of the water pressure propagated through the water, by making positive use of the fact that a knocking taking place in an engine produces a pulsation propagated through the cooling water.

In this connection, it is to be noted that the pulsation of pressure is produced by the knocking not only in the cooling water but also in the lubricating oil circulated in the engine. It is, therefore, possible to sense the occurrence of the knocking precisely through detecting the pulsation of the lubricating oil pressure, by exposing the diaphragm of the knocking sensing apparatus of the invention to the lubricating oil in the engine. It will be clear to those skilled in the art that the advantages of the invention described hereinbefore can equally derived from the sensing of the knocking through the detection of the pulsation in the lubricating oil pressure.

What is claimed is:

1. An apparatus for sensing a knocking taking place in an internal combustion engine having a cylinder block through which cooling water circulates comprising:
   a diaphragm mounted to the block and directly responsive to a pulsation in pressure of the cooling water, said diaphragm being of a substantially partially spherical surface;
   means adjacent said diaphragm for sensing the pulsating movement thereof in a manner like alternating current; and
   means for producing an output corresponding to said pulsation in fluid pressure.

2. An apparatus as set forth in claim 1 further comprising means for generating magnetism; a magnetic circuit means including said diaphragm as its portion; means for detecting in a manner like alternating current that change in a magnetic flux existent in said circuit means which is caused by the pulsating movement of said diaphragm.

3. An apparatus as set forth in claim 1 further comprising a piezoelectric element attached to said diaphragm to sense the pulsation of said diaphragm in a manner like alternating current.

* * * * *